(12) United States Patent
Brucher et al.

(10) Patent No.: US 10,042,675 B2
(45) Date of Patent: Aug. 7, 2018

(54) ASSOCIATING COMPUTING TASK WITH A SUBSET OF DATA FOR SEISMIC PROCESSING

(71) Applicant: TOTAL SA, Courbevoie (FR)

(72) Inventors: Matthieu Brucher, Pau (FR); Nils-Alexander Muller, Pau (FR)

(73) Assignee: TOTAL SA, Courbevoie (FR)

( * ) Notice: Subject to any disclaimer, the term of this patent is extended or adjusted under 35 U.S.C. 154(b) by 74 days.

(21) Appl. No.: 15/114,047

(22) PCT Filed: May 16, 2014

(86) PCT No.: PCT/IB2014/001073
§ 371 (c)(1),
(2) Date: Jul. 25, 2016

(87) PCT Pub. No.: WO2015/110856
PCT Pub. Date: Jul. 30, 2015

(65) Prior Publication Data
US 2016/0357607 A1    Dec. 8, 2016

(30) Foreign Application Priority Data

Jan. 24, 2014 (EP) .................................. 14305102

(51) Int. Cl.
*G06F 9/46* (2006.01)
*G06F 9/50* (2006.01)

(52) U.S. Cl.
CPC .......... *G06F 9/5033* (2013.01); *G06F 9/5083* (2013.01)

(58) Field of Classification Search
None
See application file for complete search history.

(56) References Cited

U.S. PATENT DOCUMENTS

2011/0060821 A1    3/2011    Loizeaux

OTHER PUBLICATIONS

International Search Report for PCT/IB2014/001073, dated Jan. 20, 2015, 3 pages.
Written Opinion of the International Searching Authority for PCT/IB2014/001073, dated Jan. 20, 2015, 6 pages.

(Continued)

*Primary Examiner* — Wissam Rashid
(74) *Attorney, Agent, or Firm* — Patterson Thuente Pedersen, P.A.

(57) ABSTRACT

The present invention relates to a method for computing tasks by computing clients. The method comprises distributing tasks to the clients; the determination of the association between distributed task and clients is based on a minimization of a size of a union of the subsets of data associated with tasks distributed to computing clients of at least one group in the plurality of clients groups. In addition, for each current computing client in the plurality of computing clients retrieving the subset of data associated with the task distributed to said current computing client from the storage node of the group of the current computing client, and computing the task distributed to said current computing client based on said retrieved subset of data associated with the task distributed to said current computing client.

10 Claims, 6 Drawing Sheets

(56) References Cited

OTHER PUBLICATIONS

Cyril Briquet et al: Schedulingdata-intensive bags of tasks in P2P grids with bittorrent-enabled data distribution. Proceedings of the Second Workshop on Use of P2P. Grid and Agents for the Development ofContent Networks. Upgrade '07. Jun. 26, 2007 (Jun. 26, 2007).p. 39. XP055100829. New York. New York. USA DOI: 10.1145/1272980.1272990 ISBN: 978-1-59-593718-6.

Elizeu Santos-Neto et al: "Exploiting Replication and Data Reuse to Efficiently Schedule Data-Intensive Applications on Grids" In: "Lecture Notes in Computer Science". Jan. 1, 2005 (Jan. 1, 2005). Springer Berlin Heidelberg. Berlin. Heidelberg. XP055160411. ISSN: 0302-9743 ISBN: 978-3-54-045234-8 vol. 3277. pp. 210-232. DOI: 10.1007/11407522 12.

Young Choon Lee et al: "Practical Scheduling of Bag-of-Tasks Applications on Grids with Dynamic Resilience". IEEE Transactions on Computers. IEEE. US. vol. 37. No. 6. Jun. 1, 2007 (Jun. 1, 2007). pp. 815-825. XP011179954. ISSN: 0016-9340.

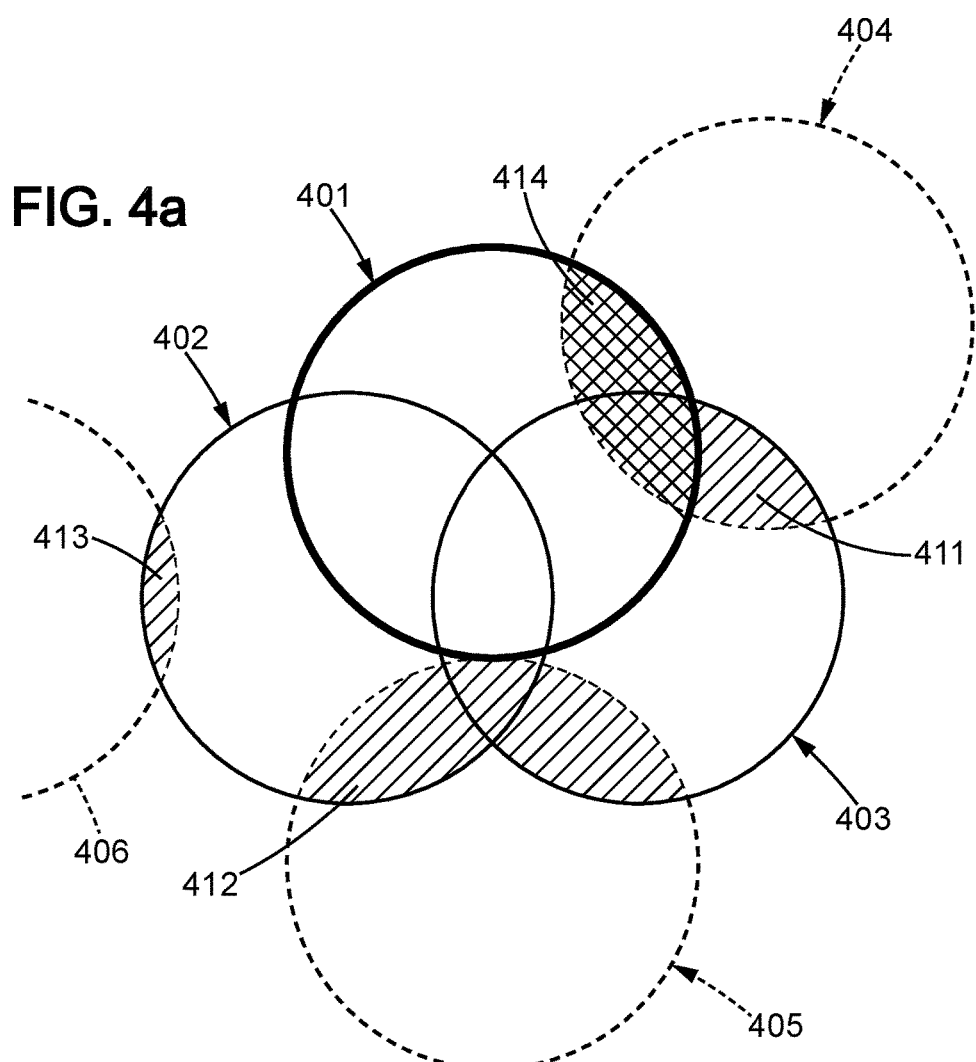

ASSOCIATING COMPUTING TASK WITH A SUBSET OF DATA FOR SEISMIC PROCESSING

RELATED APPLICATIONS

The present application is a National Phase entry of PCT Application No. PCT/IB2014/001073 filed May 16, 2014, which claims priority from EP Patent Application No. 14305102.7, filed Jan. 24, 2014, said applications being hereby incorporated by reference herein in their entirety.

FIELD OF THE INVENTION

The present invention relates to the domain of grid computing and more specifically to the domain of distributed calculation for geophysics algorithms such as seismic algorithms.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

When a distributed computation is to be performed, a distribution server may divide the computation into J "jobs". These J jobs are a subset of the computation to be performed. For instance, if a computation needs to individually invert 3000 matrixes, each jobs may represents the inversion of a single matrix or the inversion of two matrixes.

The created jobs may thus be distributed to C "clients". Most of the time, the integer C is not equal to the integer J. The clients may be physical computers but may also be computing instances created on a Supercomputer. Each client has to perform the "job(s)" allocated by the distribution server to it. To be able to perform the job, the client may need external data. This data may be stored on a network storage or an external storage server.

When the job is finished, the client refers to the distribution server, and this server allocates a new job to this client (if available).

If the size of data to be downloaded by each client on the storage server to perform the job is important, the link(s) between the storage server and the clients may quickly be overloaded. In addition, the read speed of data in the storage server may also be a limiting operation.

For instance, when performing intensive computations in seismic domain (e.g. Common Reflection Stack computation), the reading of data may represent up to 80% of the whole computation time.

Thus, there is thus a need for a computing architecture that may enhance the speed of the distributed computation, especially when the access of data for the computation is limiting.

SUMMARY OF THE INVENTION

The invention relates to a method for computing a plurality of computing tasks, each computing task being associated with a subset of data, the subset of data associated with a current computing task being acceded during the computation of said current task.

A plurality of computing clients is divided into a plurality of client groups, each current group in said plurality of clients groups comprising a current storage node.

The method comprises:
/a/ for each current client in the plurality of computing clients, determining an association between a task in the plurality of computing tasks and said current client;
/b/ distributing said plurality of computing tasks according to the determined association;
/c/ for each current group in said plurality of clients groups, retrieving by the storage node of said current group an union of the subsets of data associated with tasks distributed to computing clients of said current group;
/d/ for each current computing client in the plurality of computing clients:
/d1/ retrieving the subset of data associated with the task distributed to said current computing client from the storage node of the group of the current computing client, and
/d2/ computing the task distributed to said current computing client based on said retrieved subset of data associated with the task distributed to said current computing client;

In addition, the determination of the association between task and clients is based on a minimization of a size of a union of the subsets of data associated with tasks distributed to computing clients of at least one group in the plurality of clients groups.

A computing task is an individual problem/issue/computation that can be resolved by a single computer or computer units, for instance in few minutes or hours.

Each task is associated with a subset of data that is needed locally to compute the task. Most of the time, the subsets of data are stored in an external storage server (e.g. a SAN server) dedicated to the storage.

Prior to the computation, the client may request the access to its subset of data.

The storage node is also known as "node" or "I/O node" (for input/output node).

In step /a/, the association may be a "one-to-one" association but the association may also associate several tasks to a single client at the same time.

The distribution of the tasks of step /b/ may comprise the sending messages that include the identification of the associated task(s) (and optionally the identification of the associated subset of data needed for the computation) sent to the clients.

The I/O node may retrieve from the storage server a union of the subsets of data based on the messages sent to the clients of its group. This retrieval may be done in one step (i.e. computing the identification of the union and sending it to the storage server to retrieve in one message the union) or in a plurality of steps (e.g. sending a first message to retrieve the first subset, then sending a second message to retrieve the data of the second subset that has not been yet sent by in the first retrieval, etc.).

In order to enhance the size of the union retrieved by the I/O node, the determination of the tasks distributed to the clients of a same group is important. Thus, it is possible to determine the tasks to minimize the size of the union of the subset of data associated with tasks of the group. This minimization may be done in a plurality of ways:

creating hundreds of random distributions of tasks for each clients of the group and determining the random distribution that minimize the size of the union;

if a distance may be defined for the tasks (e.g. the geographical distance of center points of tasks in a model), choosing randomly a first task (or based on a predetermined position in the model, e.g. top-left corner), choosing a second task corresponding to the closest other tasks, choosing a third task that minimize the sum of distance between the third task—second task and between the third task—first task, etc.

determining randomly a first task (or based on a predetermined position in the model, e.g. top-left corner), using a simulated annealing algorithm to determine the closest tasks to be associated with clients of the same group.

etc.

In addition, the minimization of a size of a union may be performed via a maximization of the size of the intersection between the subsets (the size of a zone being intersects twice may be taken in account twice in the size of the intersection).

In a possible embodiment, the minimization may be done for all groups.

For instance, the determination of the association between task and clients may be based on a minimization of a sum of size of a union of the subsets of data associated with tasks distributed to computing clients of each group in the plurality of clients groups.

Therefore, the optimization may be performed for all groups and a global optimization may be searched.

If a distance is defined between each task, determining the association may comprise, for a current group in the plurality of clients groups:

selecting a first task;

selecting second tasks, each distance between each second task and the first task is less than a predetermined distance, wherein the predetermined distance is increased if a number of selected second tasks is less than a number of tasks that can be distributed to the clients of the current group.

In other word, the tasks distributed to a group may be in the same area (in a "circle" around the first task) and thus may be very close to each other. If the number of tasks available for the predetermined distance is too low and does not match the number of clients in the group (or the number of tasks that can be distributed to the clients of the group), the predetermined distance may be increased. In a possible embodiment, the predetermined distance may start at 0.

The distance is a mathematical distance and thus the "circle" may be represented as a square or a rectangle.

Advantageously, the method may further comprise, when a current client finishes the computing of a previous task distributed to said current client:

determining an new association between a task in the plurality of computing tasks and said current client;

distributing said new task to the current client;

The determination of the new association may be based on a minimization of a size of a union of the subset of data associated with the previous task and the subset of data associated with the new task.

Therefore, the local cache in the computing client may be used and the request to the I/O node may be limited.

In addition, the method may further comprise, when a current client finishes the computing of a previous task distributed to said current client:

determining an new association between a task in the plurality of computing tasks and said current client;

distributing said new task to the current client;

The determination of the new association may be based on a minimization of a size of a union of the subsets of data associated with tasks being computed by computing clients of the group and the subset of data associated with the new task.

Therefore, the local cache in the I/O node may be used and the request to the storage server may be limited.

In a possible embodiment, a plurality of computing tasks may be associated with at least one current client in step /a/.

Then, the client may have a plurality of task to compute and may avoid sending a message to the distributing server whenever he finishes the computation of each task.

The plurality of computing tasks may be distributed to the client in step /b/.

Indeed, the access to the storage server comprises a payload and the access of very small amount of data is similar to a greater amount of data. Thus, it is advantageous to group small requests and to provide the client with a plurality of small tasks to be computed.

In a possible embodiment, the step /d2/ may comprise:

determining an order for the computation of distributed tasks to maximize the intersection of two subsets of data associated with two consecutive computed tasks in the determined task order, computing distributed tasks according the determined task order.

This order may enhance the use of the local cache in the computing clients.

This order may be computed locally or by the distributing server.

The step /d2/ may comprise:

determining an order for the computation of distributed tasks based on a Peano curve, computing distributed tasks according the determined task order.

The Peano curve or Hilbert Peano curve enables the maximization of the intersection of the two subsets of data associated with two consecutive computed tasks in the determined task order.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 4a describes the determination of a new task to be associated with a client of an I/O node;

DETAILED DESCRIPTION OF THE DRAWINGS

Figure 1:
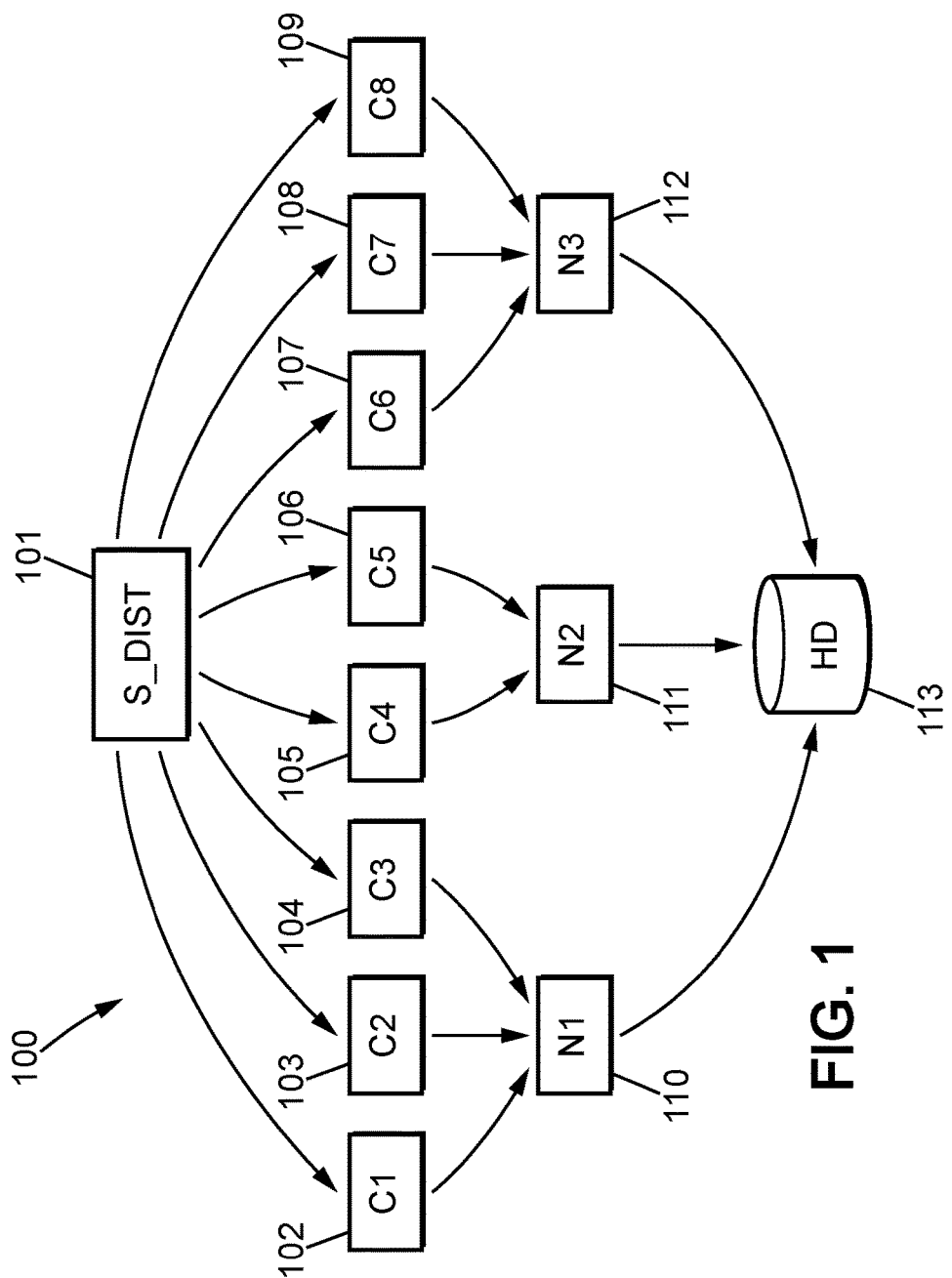
FIG. 1 is a diagram of a possible computation scheme.

FIG. 1 is a diagram of a possible computation scheme.

When computing a parallelizable complex problem, it is possible to divide the problem into a plurality of single tasks (or "computing tasks") and to compute these tasks with dozens, hundreds of thousands computing units (or "computing clients" 102-109).

Therefore, a central distributing server 101 manages the computation and centralizes the results. This distributing server 101 splits the problem into a plurality of tasks to be resolved.

Each computing task being associated with a subset of data that is acceded during the computation of the task: for instance, for the computation of a local mean value for a pixel image, the subset of data being acceded is the values of pixels at a given distance of a current pixel. The local mean value for that current pixel is then the mean of the values of pixels at the given distance.

One or more tasks may be distributed to all available clients 102-109. Most of the time, they do not have the subset of data associated with the distributed tasks in their local memory (e.g. RAM, flash memory or hard disk) and they requests access to the data by sending a message to a storage server 113 that handles the static data for every tasks. Thus, if there is thousands of computing clients, the storage server should be able to receive thousands of requests and send back to the clients thousands of messages containing the requested subset of data.

Due to the limitation of the memory access (the memory comprising, most of the time, to limit the expenses, standard magnetic memory plates), it may be difficult and long to handle thousands of requests.

Therefore, an intermediary level (or more) may be implemented: the I/O nodes level. An I/O node may be a dedicated computing unit but may also be a computing clients 102-109 that also handle an I/O role.

The I/O nodes 110-112 are units that are designed to be the interfaces with the storage server and to limit the accesses to this storage server.

All computing clients may be associated with a I/O node: for instance, computing clients 102-104 are associated with I/O node 110, computing clients 105-106 are associated with I/O node 111, and computing clients 107-109 are associated with I/O node 112.

Thus, messages requesting the access to a subset of data are first sent to the I/O node associated with the client. The I/O node is thus able to determine a union of all requested subset and sent only one request to the storage server. In addition, if the requested subsets of data are similar (e.g. they comprise an important intersection), the union of requested subsets of data may be significantly reduced.

In addition, the I/O node may be used as a cache node: by implementing a cache (a circular cache, for instance), the I/O node may avoid soliciting the storage server if a previous request is similar and previously sent data may be reused.

Then, it is advantageous to determine the tasks to be associated with the different clients 102-109 in order to maximize the intersection for subsets of data in a same node group (i.e. 102-104, 105-106, 107-109) (or to minimize the union of the requested subsets) and/or to maximize the reuse of data for two consecutive computed tasks.

Figure 2:
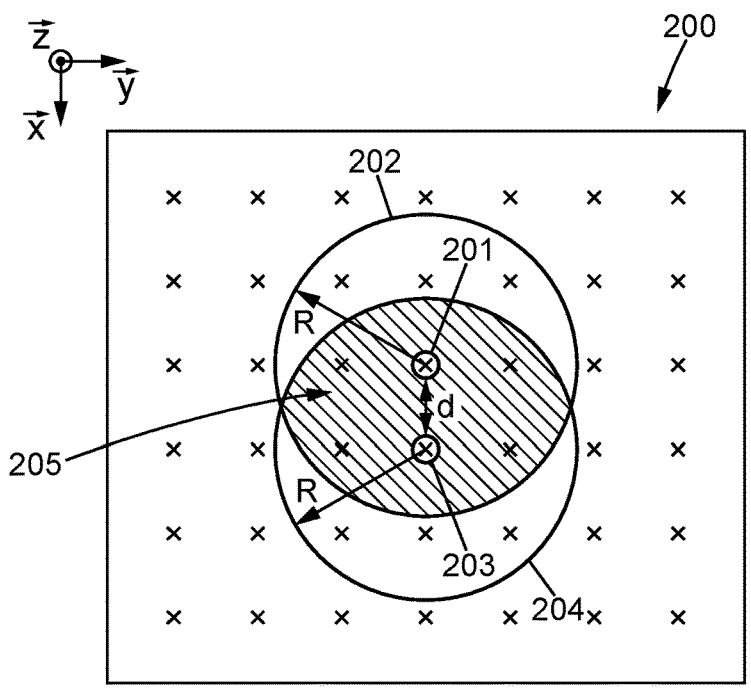
FIG. 2 is a representation of subsets of data associated with two different tasks in a model.

FIG. 2 is a representation of subsets of data associated with two different computing tasks in a model 200.

As detailed in relation with FIG. 1, the tasks distributed to clients of a same group (i.e. clients associated with a same node) could be wisely determined.

If the group comprises two clients, two tasks may be distributed to the clients of that group.

For instance, for seismic processing, it is usual that for computing a vertical column of pixels along $\vec{x}$ and for the point 201 in the plane $(\vec{x}, \vec{y})$, all pixels that have $(\vec{x}, \vec{y})$ coordinates within a distance R from the point 201 should be acceded for the computation (circle 202).

In a similar way, for computing a vertical column of pixels along $\vec{z}$ and for the point 203 in the plane $(\vec{x}, \vec{y})$, all pixels that have $(\vec{x}, \vec{y})$ coordinates within a distance R from the point 203 should be acceded for the computation (circle 204).

Thus, the hatched zone 205 may be used by the tasks associated with point 201 and 203.

Therefore, for tasks associated with clients of a same group, it is advantageous that the size of a union of the subsets of data associated with these tasks is minimized (i.e. the hatched zone is maximized). Thus, the quantity of data requested by the I/O node of the group may be reduced to its minimum.

In other words, it is advantageous to distribute tasks to clients of the same group to minimize the sum of distances d between the center points 201 and 203.

Figure 3:
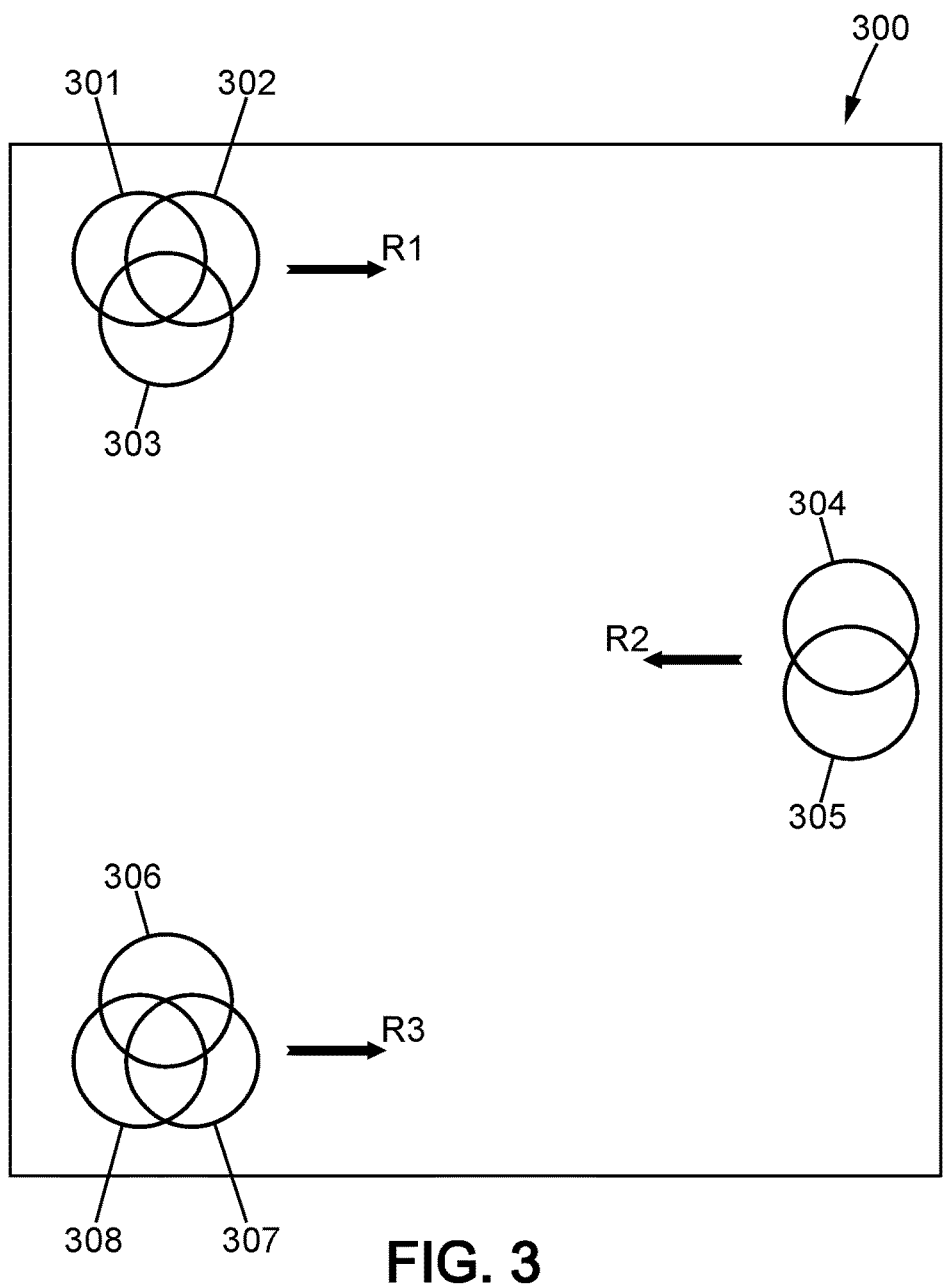
FIG. 3 is representation of tasks regrouped into three I/O nodes.

FIG. 3 is representation of tasks regrouped into three I/O nodes.

In this representation 300, three tasks are distributed to a first group of clients and the subsets of data associated with these tasks are represented by the circles 301, 302, 303. In addition, two tasks are distributed to a second group of clients and the subsets of data associated with these tasks are represented by the circles 304 and 305. Finally, three tasks are distributed to a third group of clients and the subsets of data associated with these tasks are represented by the circles 306, 307 and 308.

As previously indicated, the tasks distributed to clients of a same group are chosen so that the intersection of subsets of data associated with tasks is maximal.

Once the distributed tasks are computed, it is possible to distribute new tasks to the clients of said groups based on the last tasks computed. Thus, the data already downloaded by the I/O node of the group and/or the clients may be reused: this process limit the quantity of data to be downloaded.

For instance, the tasks distributed to the clients of the first group may be chosen so that the circles 301, 302 and 303 remain grouped and are slightly moved in the direction R1. In a similar way, the tasks distributed to the clients of the second group may be chosen so that the circles 304 and 305 remain grouped and are slightly moved in the direction R2. Finally, the tasks distributed to the clients of the third group may be chosen so that the circles 306, 307 and 308 remain grouped and are slightly moved in the direction R3.

FIG. 4a describes the determination of a new task to be associated with a client of an I/O node.

For this figure, it is considered that the circles 401, 402 and 403 represents the subset of data associated with three tasks associated with three clients of an I/O node. In addition, it is considered that the tasks associated with the subset of data 401 has just been computed and that the related client have no more task to computed.

Therefore, the distributing server may determine a new task to distribute to this client. For instance, the new task distributed to the client may be associated with the subset represented by the circle 404 or the circle 405 or the circle 406.

The determination of the new task may be based on:
(i) a minimization of a size of an union of the subsets of data associated with tasks being computed by computing clients of the group (i.e. the circles 401, 402 and 403) and the subset of data associated with the new task (e.g. the circle 404 or 405 or 406), and/or
(ii) a minimization of a size of a union of the subset of data associated with the previous task (i.e. the circle 401) and the subset of data associated with the new task (e.g. the circle 404 or 405 or 406).

In the case (i), the circle 405 and the circle 404 seems to be equivalent as the hatched zone 411 and 412 (which represents respectively the intersection between the union of the subsets of data 401, 402 and 403 and the subset of data 404, respectively 405). The task associated with circle 406 seems inappropriate as the intersection 413 of the circle 406 with the union of subset 401, 402 and 403 is very small (and the size of the union of said subsets is important).

In the case (ii), only the circle 404 seems adequate as this is the only circle that intersects the circle 401 (see hatched zone 414). To take in account both (i) and (ii), it is possible to weight the obtained size and to minimize this weighted size.

The minimization of the size of the union may also be the maximization of the size of the intersection.

Figure 4B:
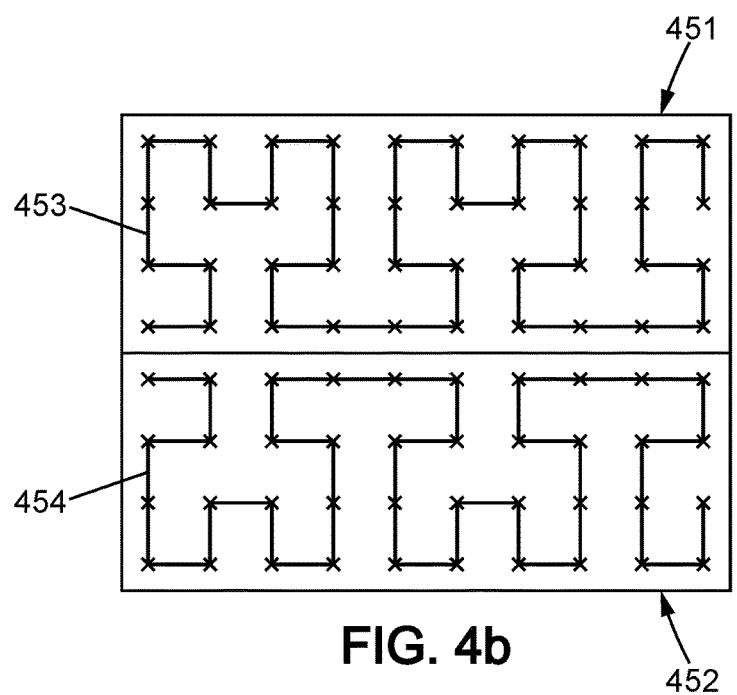
FIG. 4b describes the determination of a new task to be associated with a client based on a Peano curve.

FIG. 4*b* describes the determination of a new task to be associated with a client based on a Peano curve.

In a possible embodiment, a plurality of tasks may be distributed to a client even before it computes a single task. Thus, it is possible to limit the number of interactions with the distributing server.

For instance, all crosses in the rectangle 451 may be distributed to a first client of a group and the crosses in the rectangle 452 may be distributed to a second client of the group.

In order to compute the distributed tasks the client or the distributing server may affect an order to the distributed tasks, this order determines the computation order of said tasks by the client.

This order may be determined to maximize the intersection of two subsets of data associated with two consecutive computed tasks in the determined task order.

Thanks to that, it is possible to limit the quantity of data exchange between the client and the I/O node, the client handling a small memory buffer (for instance a circular buffer) to store the latest subsets of data.

For instance, the order may be determined thanks to a Peano curve or Hilbert Peano curve 453 or 454.

Figure 5:
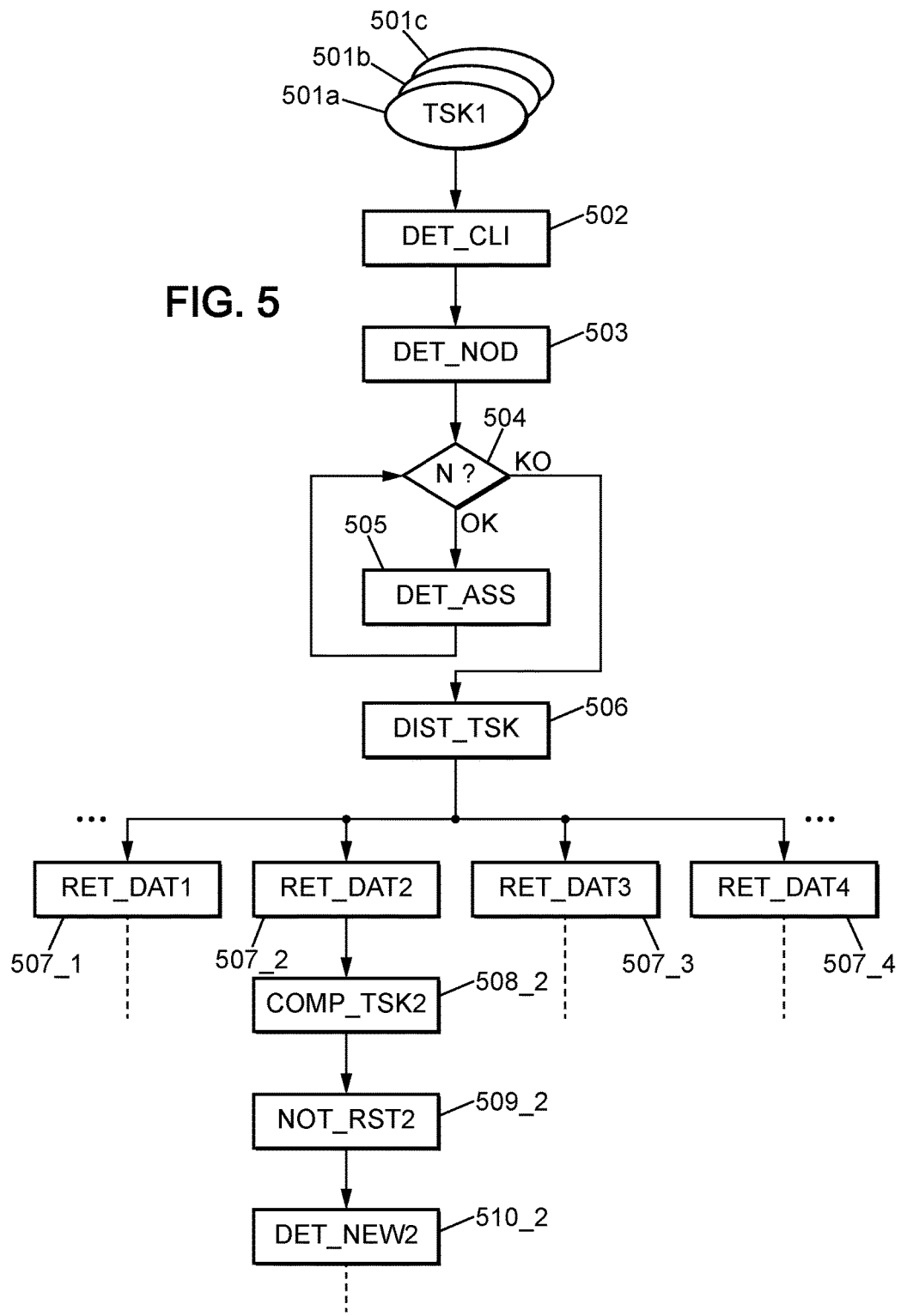
FIG. 5 is a flow chart describing a possible embodiment of the present invention.

FIG. 5 is a flow chart describing a possible embodiment of the present invention. Part of this flow chart can represent steps of an example of a computer program which may be executed by the device of FIG. 6.

When a plurality of task is to be computed (501*a*, 501*b*, 501*c*), it is possible to determine a plurality of clients to be used for these computations (step 502). It is noted that the list of clients that can be used may dynamically change as the computer resources may evolve (e.g. other priority computations may reserve static computer resources).

Based on that list on available computing clients, it is possible to associate them to a plurality of I/O nodes or "storage node" (step 503): the clients associated with a same I/O node form a node group or "clients group".

For each node (loop 504), and for each current client of said node, it is possible to determine an association between a task and said current client (step 505) based on a minimization of a size of an union of the subsets of data associated with tasks distributed to computing clients of said node.

Then, the distributing server may distribute (step 506) said the computing tasks according to the determined association.

Thus, each client may retrieve the subset of data associated with the distributed task (steps 507_1, 507_2, 507_3, 507_4, etc.) by sending a message to the I/O node (as detailed above).

The I/O node may then retrieve a union of the subsets of data associated with tasks distributed to computing clients of said current group.

For each current computing client, the current client may thus compute the task distributed to the current client based on said retrieved subset of data (steps 508_2, etc.). Once computed and if no more task is to be computed, the client may notify the distributing server with the results (steps 509_2, etc.). Then, the distributing server may determine a new task to be computed (or a new set of tasks) by this client (steps 510_2, etc.) as detailed above.

The process describe here may be reiterate while there is still some tasks to be computed.

Figure 6:
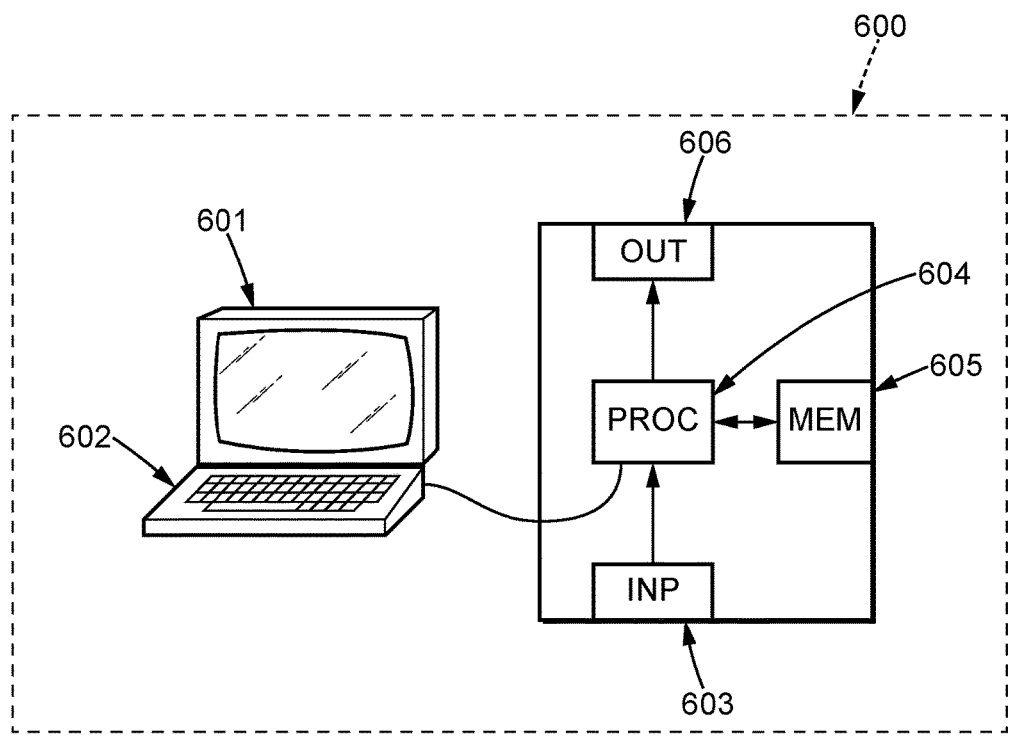
FIG. 6 is a possible embodiment for a device that enables the present invention.

FIG. 6 is a possible embodiment for a device that enables the present invention. For instance, this device may be a distributing server (101) or a computing client (102-109) and/or a I/O node (110-112).

In this embodiment, the device 600 comprise a computer, this computer comprising a memory 605 to store program instructions loadable into a circuit and adapted to cause circuit 604 to carry out the steps of the present invention (either the steps of the executed by the distributing server, the clients or the nodes) when the program instructions are run by the circuit 604.

The memory 605 may also store data and useful information for carrying the steps of the present invention as described above.

The circuit 604 may be for instance:
a processor or a processing unit adapted to interpret instructions in a computer language, the processor or the processing unit may comprise, may be associated with or be attached to a memory comprising the instructions, or
the association of a processor/processing unit and a memory, the processor or the processing unit adapted to interpret instructions in a computer language, the memory comprising said instructions, or
an electronic card wherein the steps of the invention are described within silicon, or
a programmable electronic chip such as a FPGA chip (for «Field-Programmable Gate Array»).

This computer comprises an input interface 603 for the reception of
the results of the distributed tasks (for the distributing server);
the distributed tasks and the associated data (for the clients);
the requests for the subsets of data and the subsets of data (for the I/O nodes);
and an output interface 406 for providing:
the distributed tasks (for the distributing server);
the results of distributed tasks and the requests for associated subset of data (for the clients);
the subsets of data (for the I/O nodes);

To ease the interaction with the computer, a screen 601 and a keyboard 602 may be provided and connected to the computer circuit 604.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method for computing a plurality of computing tasks, each computing task being associated with a subset of data, the subset of data associated with a current computing task being accessed during the computation of said current task,
   a plurality of computing clients being divided into a plurality of client groups, each current group in said plurality of clients groups comprising a current storage node;
   wherein said method comprises:
   /a/ for each of a current client in the plurality of computing clients, determining an association between a task in the plurality of computing tasks and said current client;
   /b/ distributing said plurality of computing tasks according to the determined association;
   /c/ for each of a current group in said plurality of clients groups, retrieving by the storage node of said current group an union of the subsets of data associated with tasks distributed to computing clients of said current group;
   /d/ for each of a current computing client in the plurality of computing clients:
      /d1/ retrieving the subset of data associated with the task distributed to said current computing client from the storage node of the group of the current computing client, and
      /d2/ computing the task distributed to said current computing client based on said retrieved subset of data associated with the task distributed to said current computing client;
   wherein the determination of the association between task and clients is based on a minimization of a size of an union of the subsets of data associated with tasks distributed to computing clients of at least one group in the plurality of clients groups.

2. The method according to claim 1, wherein the determination of the association between task and clients is based on a minimization of a sum of size of a union of the subsets of data associated with tasks distributed to computing clients of each group in the plurality of clients groups.

3. The method according to claim 1, wherein, a distance being defined between each task, and wherein determining the association comprises, for the current group in the plurality of clients groups:
   selecting a first task;
   selecting second tasks, each distance between each second task and the first task is less than a predetermined distance, wherein the predetermined distance is increased if a number of selected second tasks is less than a number of tasks that can be distributed to the clients of the current group.

4. The method according to claim 1, wherein the method further comprises, when the current client finishes the computing of a previous task distributed to said current client:
   determining an new association between a new task in the plurality of computing tasks and said current client;
   distributing said new task to the current client;
   wherein the determination of the new association is based on a minimization of a size of an union of the subset of data associated with the previous task and the subset of data associated with the new task.

5. The method according to claim 1, wherein the method further comprises, when the current client finishes the computing of a previous task distributed to said current client:
   determining an new association between a task in the plurality of computing tasks and said current client;
   distributing said new task to the current client;
   wherein the determination of the new association is based on a minimization of a size of an union of the subsets of data associated with tasks being computed by computing clients of the group and the subset of data associated with the new task.

6. The method according to claim 1, wherein a plurality of computing tasks is associated with at least one current client in step /a/.

7. The method according to claim 6 wherein a plurality of computing tasks is distributed to a client in the plurality of computing client in step /b/.

8. The method according to claim 7, wherein the step /d2/ comprises:
   determining an order for the computation of distributed tasks to maximize the intersection of two subsets of data associated with two consecutive computed tasks in the determined task order,
   computing distributed tasks according the determined task order.

9. The method according to claim 7, wherein the step /d2/ comprises:
   determining an order for the computation of distributed tasks based on a Peano curve,
   computing distributed tasks according the determined task order.

10. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

* * * * *